United States Patent [19]

Nysten et al.

[11] Patent Number: 5,896,837
[45] Date of Patent: Apr. 27, 1999

[54] MULTIPART CYLINDER HEAD COVER FOR AN INTERNAL-COMBUSTION ENGINE

[75] Inventors: Frank Nysten, Aachen; Ernst Siegfried Hartmann, Overath, both of Germany

[73] Assignee: FEV Motorentechnik GmbH & Co. KG, Aachen, Germany

[21] Appl. No.: 09/076,947

[22] Filed: May 13, 1998

[30] Foreign Application Priority Data

May 14, 1997 [DE] Germany ............... 297 08 541 U

[51] Int. Cl.$^6$ ............... F01M 9/10; F02F 7/00
[52] U.S. Cl. ............... 123/90.38; 123/195 C; 123/468
[58] Field of Search ............... 123/90.38, 195 C, 123/198 E, 468, 469

[56] References Cited

U.S. PATENT DOCUMENTS

| | | | |
|---|---|---|---|
| 4,538,560 | 9/1985 | Alden | 123/90.38 |
| 4,608,950 | 9/1986 | Payne et al. | 123/195 C |
| 5,095,860 | 3/1992 | Newell | 123/90.38 |
| 5,452,690 | 9/1995 | Kobayashi | 123/90.38 |
| 5,699,770 | 12/1997 | Matsumoto et al. | 123/90.38 |
| 5,724,930 | 3/1998 | Sakurai et al. | 123/90.38 |

*Primary Examiner*—Weilun Lo
*Attorney, Agent, or Firm*—Venable; Gabor J. Kelemen

[57] ABSTRACT

A cylinder head cover to be positioned on a cylinder head of an internal-combustion engine includes first and second separate cover parts fitting together along a longitudinally extending parting joint. The first and second cover parts have complemental portions for surrounding a fuel supply line leading into the cylinder head. Securing devices releasably attach the first and second cover parts to one another and to the cylinder head. A seal is provided between the first and second cover parts for sealing them to one another and for providing that the complemental portions of the first and second cover parts sealingly surround the fuel supply line.

4 Claims, 3 Drawing Sheets

MULTIPART CYLINDER HEAD COVER FOR AN INTERNAL-COMBUSTION ENGINE

CROSS REFERENCE TO RELATED APPLICATION

This application claims the priority of German Application No. 297 08 541.7 filed May 14, 1997, which is incorporated herein by reference.

BACKGROUND OF THE INVENTION

In reciprocating piston-type internal-combustion engines the valve drive chamber is conventionally sealingly closed from the environment by means of a one-piece cylinder head cover.

It is a disadvantage of the conventional cylinder head covers in engines operating with fuel injection that they do not allow an easy accessibility to the valve drive chamber, for example, for the purpose of setting the valve clearance. In such arrangements, for removing the cylinder head cover, it is necessary to disconnect the couplings of the fuel lines belonging to a pressure system to permit an opening of the pressure system.

SUMMARY OF THE INVENTION

It is an object of the invention to provide an improved cylinder head cover of the above-outlined type which permits a simple accessibility to the valve drive chamber and, at the same time, provides for a reliable seal therefor.

This object and others to become apparent as the specification progresses, are accomplished by the invention, according to which, briefly stated, the cylinder head cover to be positioned on a cylinder head of an internal-combustion engine includes first and second separate cover parts fitting together along a parting joint extending in the longitudinal direction. The first and second cover parts have complemental portions for surrounding a fuel supply line leading into the cylinder head. Securing devices releasably attach the first and second cover parts to one another and to the cylinder head. A seal is provided between the first and second cover parts for sealing them to one another and for providing that the complemental portions of the first and second cover parts sealingly surround the fuel supply line.

By a reciprocating piston-type internal-combustion engine within the meaning of the invention there is meant both an in-line engine provided with a cylinder head cover composed of at least two cover parts and a V-engine whose two cylinder series are arranged in a V-configuration and each of which is provided with a divided cylinder head cover according to the invention. Each cylinder has at least one intake valve and one exhaust valve; it is to be understood, however, that the invention may find application in engines which have cylinders provided with a multiple of intake and exhaust valves. Each cylinder further has at least one injection nozzle which injects fuel either directly into the combustion chamber of the cylinder or into a region immediately ahead of the combustion chamber, such as a preliminary chamber.

It is further noted that by "longitudinal direction" there is meant an orientation of the parting joint parallel to the axis of the engine crankshaft. By making the cylinder head cover from two cover parts whose parting joint edgewise surrounds the fuel supply lines leading into the cylinder head, that is, to the respective fuel injection nozzles, a simple removal of the cylinder head cover and thus an easy accessibility to the valve drive chamber is provided without the need to remove first the injection nozzles or parts of the fuel supply lines. The parting joint of the cover has to be located such that the fuel supply lines in the region of the injection nozzles are situated in the zone of the parting plane of the two cover part and are sealingly surrounded. If, for example, the valve clearance is to be adjusted, merely the connection between the two cover parts and their connection to the cylinder head needs to be released so that the cover parts may be removed. It is thus not necessary to open the fuel injection circuit.

According to an advantageous feature of the invention, the parting joint is provided with sealing means to ensure that the cover parts sealingly surround the fuel supply lines for the injection nozzles, mounted earlier with the cylinder head. The two cover parts are sealed with respect to one another, on the one hand, and the fuel supply lines for the injection nozzles are radially sealed, on the other hand.

It has been found expedient to provide a shaped seal along the entire length of the parting joint of one of the cover parts. The other cover part has a sealing arrangement only in the region of the fuel supply lines for the injection nozzles. Expediently, the seals are made of an elastomer plastic.

According to a further advantageous feature of the invention, at least one positioning element is arranged between the cover parts to ensure that the two cover parts may be joined together in an accurate alignment during assembly. As positioning elements, for example, fitting pins and/or fitting sleeves may be used.

In accordance with a further advantageous feature of the invention, the cover parts are coupled to one another by connecting elements, such as readily releasable bolts. Or, for connecting the two cover parts, the latter may be provided with shaped flange surfaces held together by biased clamps.

According to a particularly advantageous feature of the invention, the cylinder head cover is connected with the cylinder head with the intermediary of an acoustic insulation. For this purpose, between the cylinder head and the cylinder head cover an elastomer plastic seal is arranged and further, between the bolt head and the cylinder head cover at least one acoustic insulating element is arranged.

Suitable materials for the cover parts are metals, plastics or fiber-reinforced plastics. Dependent upon the cover material, the cover may be made by casting such as injection casting or by deep drawing.

DESCRIPTION OF THE PREFERRED EMBODIMENT

Figure 1:
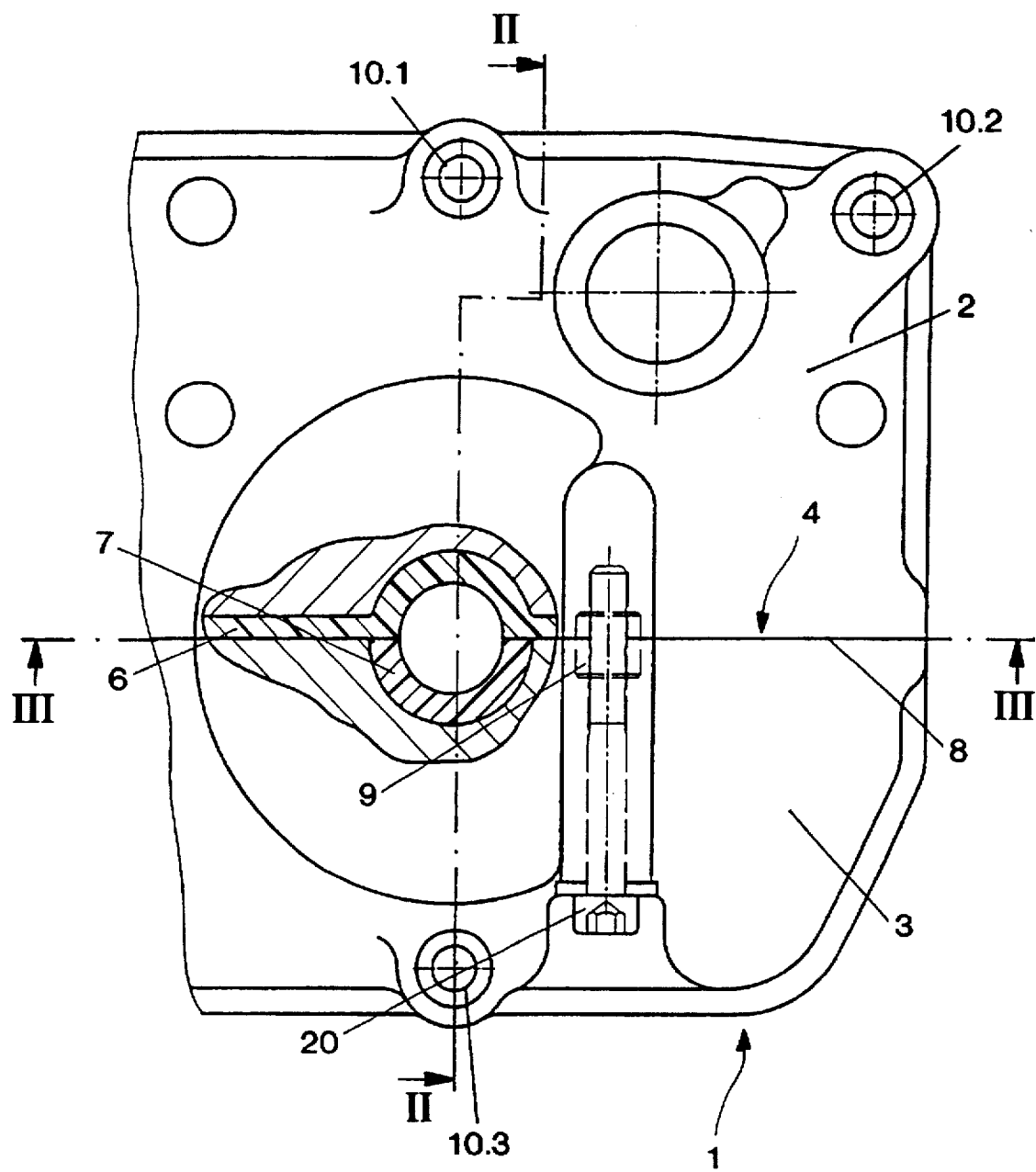
FIG. 1 is a partially sectional, fragmentary top plan view of a cylinder head cover according to a preferred embodiment of the invention.

FIG. 1 illustrates a cylinder head cover 1 of a reciprocating piston-type internal-combustion engine (not shown). The cylinder head cover 1 is composed of two releasably connectable cover parts 2 and 3 which may be of metal, plastic or fiber-reinforced plastic.

A sealed connection between the cover parts 2 and 3 is ensured by providing, in the parting joints 4, sealing elements 6, 7 which seal the facing sealing faces 8 of the cover parts 2 and 3 against the external environment along the parting joint 4. Further, the shaped seal 6 and the complemental seal (half seal) 7 surround the fuel supply line (not shown in FIG. 1) for a fuel injection nozzle so that the valve drive chamber is sealed from the external environment. The valve drives are not shown in the Figures for the sake of clarity. The seals 6 and 7 disposed in the parting joints 4 are expediently made of an elastomer plastic.

The two cover parts 2 and 3 are connected to one another by bolts 20 (only one is shown) to provide a firm connection therebetween. The cover parts 2 and 3 may be additionally exactly positioned (aligned) with respect to one another by providing positioning sleeves 9 between the cover parts 2 and 3. The positioning sleeves 9 ensure first of all that the sealing faces oriented towards the cylinder head lie flat thereon and thus provide for a reliably hermetic connection with the cylinder head. It is particularly expedient to arrange the connecting bolts 20 in the vicinity of the fuel supply lines for the injection nozzles because such an arrangement delivers a high pressing force to the sealing elements which surround the respective fuel supply lines for the fuel injection nozzles.

In the embodiment according to FIG. 1, the shown connecting bolt 20 and the positioning sleeve 9 are coaxially arranged; it is also feasible to position the connecting bolt 20 and the positioning sleeve 9 at different locations in the region of the sealing face 8 of the two cover parts 2, 3. The cover parts 2 and 3 surrounding the fuel supply lines for the injection nozzles are secured to the cylinder head by bolts (not shown in FIG. 1) passing through bores 10.1, 10.2 and 10.3 provided in the cover parts 2 and 3.

Figure 2:
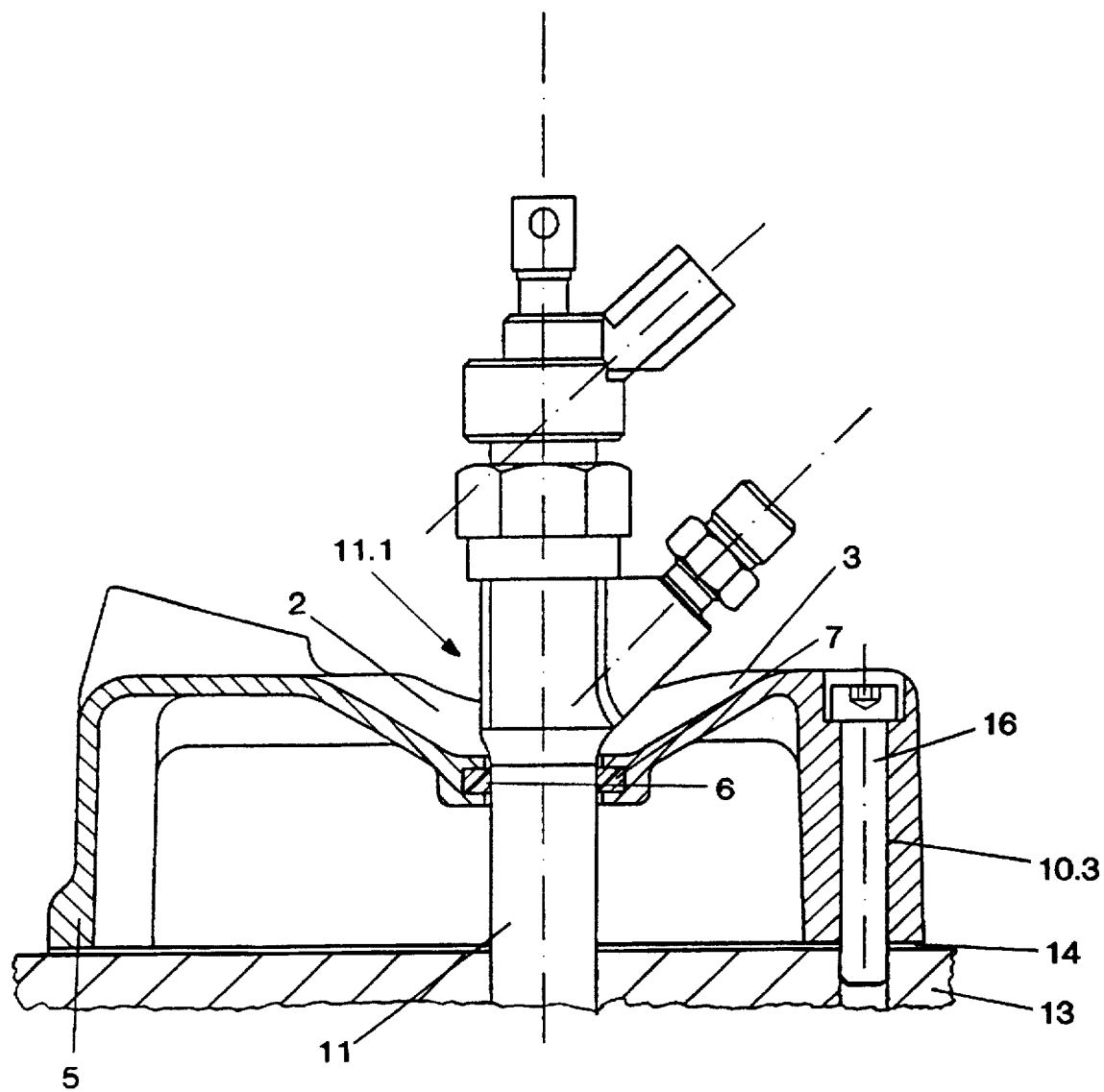
FIG. 2 is a sectional view taken along line II—II of FIG. 1.

Turning to FIG. 2, the terminus of the fuel supply line 11.1 is supported by a holder 11 which, at its other end, supports the fuel injection nozzle (not shown). The fuel injection nozzle holder 11 is surrounded by the shaped seal 6 and the complemental seal 7 which are positioned in the parting joint 4. The joined cylinder head cover 1 is connected with the cylinder head 13 by means of coupling bolts (only one bolt 16 is shown) which are inserted in bores (only bore 10.3 is shown) provided in the cylinder head cover 1. Between the cylinder head cover 1 and the cylinder head 13 a sealing element 14 is positioned, made expediently of an elastomer plastic. By means of an additional elastic insulator between the bolt head support and the cylinder head cover an additional acoustic insulation of the cylinder head cover may be effected.

Figure 3:
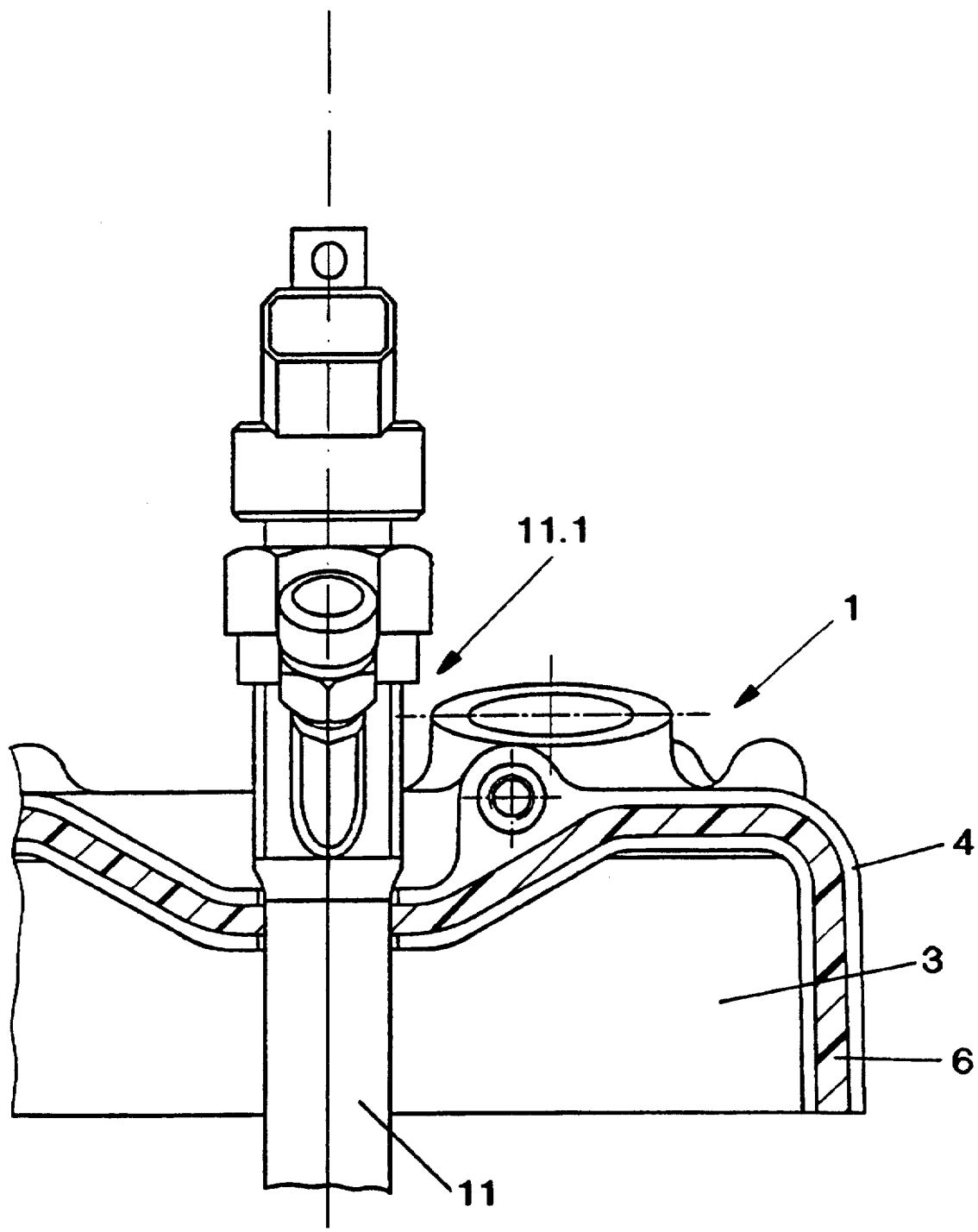
FIG. 3 is a sectional view taken along line III—III of FIG. 1.

FIG. 3 shows the shaped seal 6 disposed in the parting joint 4 of the cover part 3 for providing a seal between the cover parts 2 and 3. The seal 6 extends over the entire length of the sealing face 8 and also radially surrounds the fuel supply line 11.1 for the fuel injection nozzle.

It will be understood that the above description of the present invention is susceptible to various modifications, changes and adaptations, and the same are intended to be comprehended within the meaning and range of equivalents of the appended claims.

What is claimed is:

1. A cylinder head cover to be positioned on a cylinder head of an internal-combustion engine, comprising
    (a) first and second separate cover parts fitting together along a longitudinally extending parting joint; said first and second cover parts having complemental portions for surrounding a fuel supply line leading into the cylinder head;
    (b) first securing means for releasably attaching said first and second cover parts to one another;
    (c) second securing means for releasably attaching said first and second cover parts to the cylinder head; and
    (d) sealing means provided between said first and second cover parts for sealing said first and second cover parts to one another and for sealingly surrounding the fuel supply line by said first and second cover parts.

2. The cylinder head cover as defined in claim 1, wherein said sealing means is disposed in said parting joint.

3. The cylinder head cover as defined in claim 1, further comprising a positioning element coupled to said first and second cover parts for aligning said first and second cover parts with one another.

4. The cylinder head cover as defined in claim 1 wherein said first and second securing means include tightening bolts.

* * * * *